April 13, 1937.                    H. W. GOODALL                    2,076,632
                          HOSE END AND COUPLING STRUCTURE
                                 Filed May 14, 1935
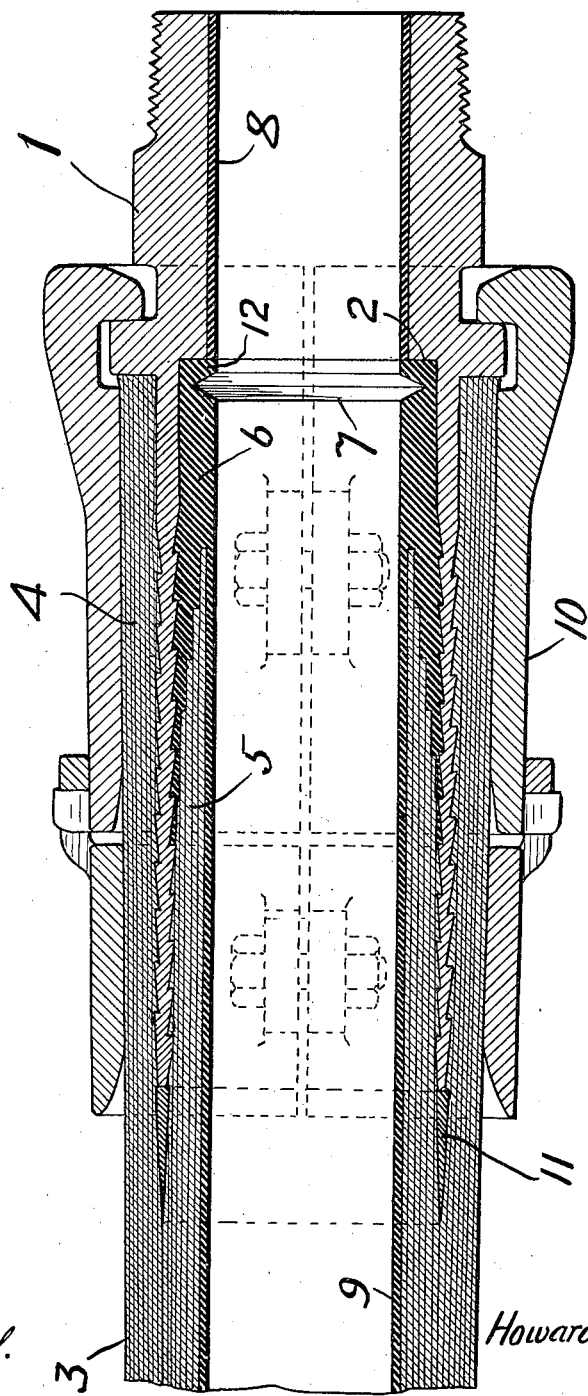
WITNESS:
INVENTOR
Howard W. Goodall
BY
Augustus B. Stoughton
ATTORNEY.

Patented Apr. 13, 1937

2,076,632

UNITED STATES PATENT OFFICE 2,076,632

HOSE END AND COUPLING STRUCTURE

Howard W. Goodall, Aldan, Pa.

Application May 14, 1935, Serial No. 21,391

2 Claims. (Cl. 285—84)

One object of the present invention is to provide a hose end structure in which the bore shall be of substantially uniform diameter throughout not only the hose section but also throughout the coupling section, while at the same time the joint between the two sections shall when subjected to internal pressure become properly sealed and, therefore, tight.

Another object of the present invention is to provide that the bore of uniform diameter through the hose and coupling sections shall be rubber lined or faced in order to avoid wear and abrasion of the coupling section.

Other objects of the invention will appear from the following description at the end of which the invention will be claimed.

Generally stated, the invention consists in a tubular coupling shank of two internal diameters having an internal shoulder between them, and a hose of which the wall is circularly split at its end portion, said shank arranged in said split between the branches thereof; a rubber tip arranged at the end of the inner branch and terminating at said shoulder and means for clamping the outer branch onto the outer surface of the shank, with or without a channel on the inside of the rubber tip adjacent the shoulder, and the shank being rubber lined in continuation of the rubber lining of the hose, or not, as preferred.

The invention comprises the improvements to be presently described and finally claimed.

In the following description reference will be made to the accompanying drawing forming part hereof and in which, The single figure is a longitudinal central sectional view illustrating one embodiment chosen from other embodiments for illustration of the invention.

Referring to the drawing, 1 is a tubular coupling shank of two internal diameters and having an internal shoulder 2 between them. 3 is a hose of which the wall is circularly split at its end portion forming branches 4 and 5. The shank is arranged in the split between the branches 4 and 5. 6 is a rubber tip arranged at the end of the inner branch 5 and it terminates at the shoulder. The rubber tip may be internally provided with a channel 7 shown as V-shaped in cross section. 8 is a rubber lining secured inside of the shank 1 at the portion of smaller diameter and the lining 8 is of substantially the same diameter as the rubber lining 9 and tip 6 of the hose. 10 are means for clamping the outer branch 4 onto the outer surface of the shank.

It has been said that the hose is rubber lined as at 9 and the wall of the hose may be variously constructed as is common practice. 11 is a filet as of duck and rubber and its wall is shown as tapering. Its purpose is to fill the space at the crotch of the split in the circular wall of the hose.

In use pressure exerted outwardly on the pure rubber tip 6 presses it against the interior of the metal shank 1 providing a seal or tight joint between them. When the channel 7 is present the terminal lip 12 is pressed against the shoulder 2 by internal pressure in the hose additionally sealing the joint between the shank and the outside of the hose. The diameter of the bore or opening through the hose, the tip, and the shank is uniform, which is an advantage that will be appreciated and understood by those skilled in the art. It may be remarked that if the rubber lining 8 is omitted the thickness of the circular metal wall of the shank may be increased so as to preserve the same internal diameter. As to the means 10, which are employed for clamping the outer branch 4 of the split onto the outside of the shank 1 it may be said that their construction forms no part of the present invention and that those skilled in the art are familiar with many types of means that will answer the purpose. It has been said that the construction of the wall 5 of the hose forms no part of the present invention and those skilled in the art know that such walls are very differently constructed and may include layers of duck and rubber and metal reenforcements of various kind.

One way of making the described hose end structure is to incorporate the pure rubber tip 6 and the shank of the coupling at appropriate times in the winding or manufacture of the hose in the customary manner on a pole. The various layers or windings of the wall of the hose may be stepped back or cut short at the end of the hose, as indicated in the drawing, in order to better secure the pure rubber tip 6 which becomes substantially a part of the rubber lining 9 of the hose.

It will be obvious to those skilled in the art, to which the invention relates, that modifications may be made in details of construction and arrangement and in matters of mere form without departing from the spirit of the invention which is not limited to such matters or otherwise than as the prior art and the appended claims may require.

I claim:

1. A hose end structure comprising a tubular metal coupling shank of two internal diameters having an internal shoulder between them and a hose of which the wall is circularly split at its end portion, said shank arranged in said split between the branches thereof, a rubber tip arranged at the end of the inner branch and terminating at the shoulder, means for clamping the outer branch onto the outer surface of said shank, and a filet arranged in the crotch of the split.

2. A hose end structure comprising a tubular metal coupling shank and a fabric hose and providing a rubber lined fluid way of substantially uniform diameter, the shank having two internal diameters providing a shoulder and being incorporated between the inner and outer parts of the end of the hose wall, the inner surface of the shank and the inner surface of the hose being rubber lined and of the same diameter, and a pure rubber internally channelled tip abutting on the shoulder and under internally applied pressure operative to seal the inner surface of the shank and the adjacent surface of the hose, and a clamp for clamping the outer part of the hose wall onto the outer surface of the shank.

HOWARD W. GOODALL.